United States Patent [19]
Wang

[11] Patent Number: 5,313,715
[45] Date of Patent: May 24, 1994

[54] VERNIER CALIPERS INCORPORATED HEIGHT GAUGE

[76] Inventor: Lung Y. Wang, No. 9, Lane 128, Tsyr Shiou Rd., Changhua, Taiwan

[21] Appl. No.: 56,135

[22] Filed: Apr. 30, 1993

[51] Int. Cl.⁵ .............................................. G01B 5/14
[52] U.S. Cl. ...................................... 33/810; 33/783; 33/832
[58] Field of Search ................ 33/810, 811, 812, 783, 33/832

[56] References Cited
FOREIGN PATENT DOCUMENTS 0618811  3/1927  France ................................ 33/783
1153429  3/1958  France ................................ 33/832

OTHER PUBLICATIONS

"Ultra-Met" Brochure, Neise Modern Tools, ©, Karl A. Neise, Inc. Nov. 1974.

Primary Examiner—William A. Cuchlinski, Jr.
Assistant Examiner—Alvin Wirthlin
Attorney, Agent, or Firm—Merchant, Gould, Smith, Edell, Welter & Schmidt

[57] ABSTRACT

A vernier calipers incorporated height gauge including a vernier calipers, a bottom block having an elongate groove at the top into which the stationary jaw of the vernier calipers is inserted and fixed by a screw, a locating block horizontally fastened to the vernier of the vernier calipers by a screw, a marking knife, and a connecting rod having a top end connected to locating block by a screw and a bottom end connected to the marking knife by a screw. An open chamfer is made on the bottom block and detachably covered with a lid for storing the marking knife, the connecting rod, and the locating block, when the height gauge is not in use.

2 Claims, 3 Drawing Sheets

VERNIER CALIPERS INCORPORATED HEIGHT GAUGE

BACKGROUND OF THE INVENTION

1. Field of the Invention

The present invention relates to measuring instruments and more specifically to a vernier calipers incorporated height gauge which is set up by incorporating a vernier calipers with a bottom block, a marking knife, a connecting rod, and a locating block.

2. Description of Prior Art

A variety of measuring instruments are known, and widely used for different purposes. For example, a caliper-square or vernier calipers shall be used for for both inside and outside measurement; a height gauge may be used for measuring the height or marking heights on a workpiece. However, preparing a complete set of measuring instruments for all purposes costs a lot. Few students can afford to buy an expensive height gauge. A height gauge is generally comprised of a rule vertically fixed to a base block at the top. Because the rule is not collapsible, much storage space is needed for a height gauge, and the rule may be damaged or hit by the user's carelessness or any object during its operation, causing a measuring error.

SUMMARY OF THE INVENTION

The present invention has been accomplished under the aforesaid circumstances. The principal object of the present invention is to provide a vernier calipers incorporated height gauge which is inexpensive to manufacture. Another object of the present invention is to provide a vernier calipers incorporated height gauge which can be used as a height gauge as well as a vernier calipers. Still another object of the present invention is to provide a vernier calipers incorporated height gauge which can be collapsed to reduce its storage space. According to one aspect of the present invention, the vernier calipers is set up by fastening a vernier calipers to an elongate groove on a bottom block and then fastening a marking knife to the vernier of the vernier calipers by a connecting rod and a locating block. According to another aspect of the present invention, the bottom block has a open chamfer at the top detachably covered with a lid for keeping the marking knife, the connecting rod, and the locating block.

BRIEF DESCRIPTION OF THE DRAWINGS

The foregoing and other objects, features and advantages of the present invention will be best understood from the following description, the appended claims and the accompanying drawings in which:

DETAILED DESCRIPTION OF THE PREFERRED EMBODIMENT

Figure 1:
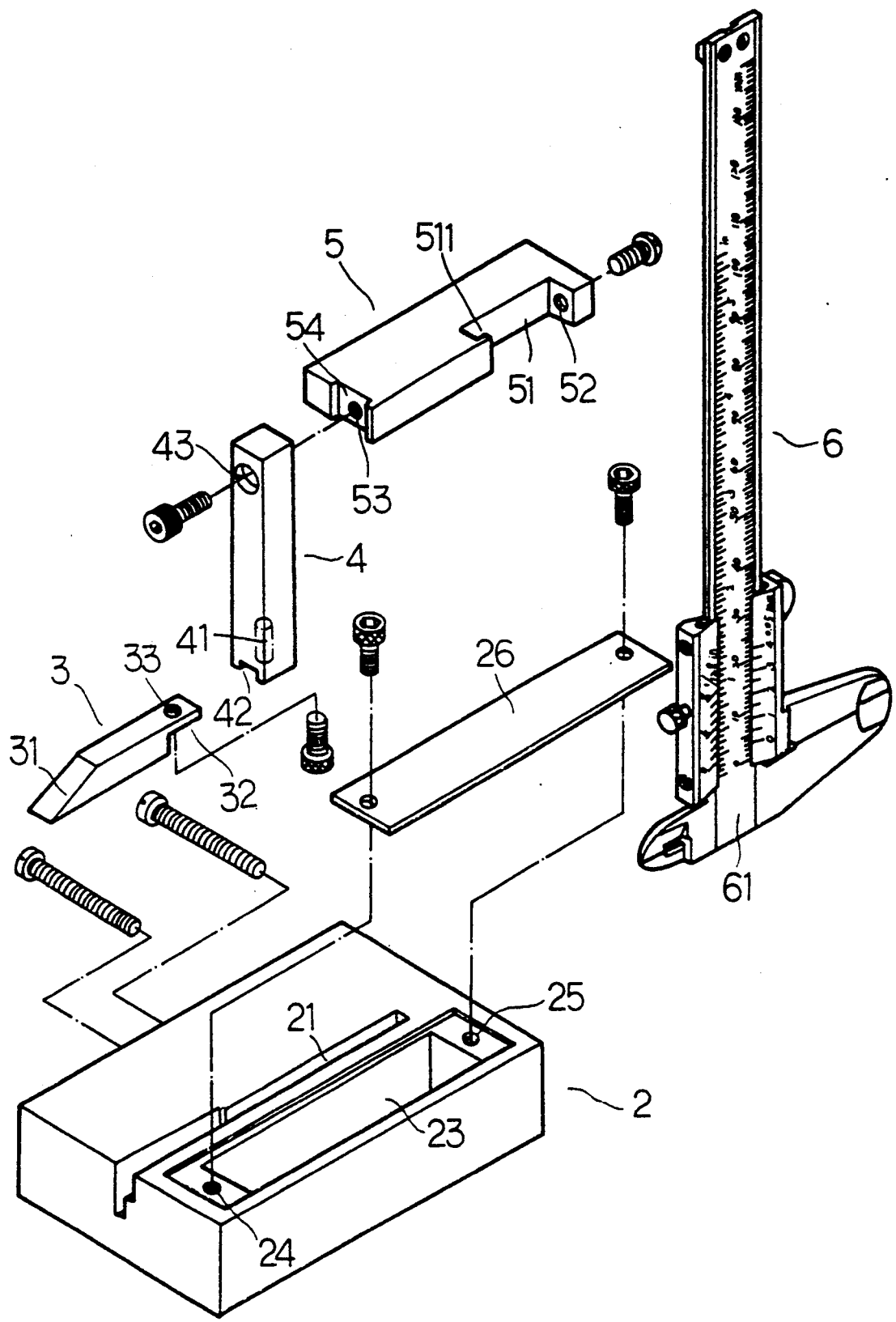
FIG. 1 is a perspective exploded view of a vernier calipers incorporated height gauge according to the preferred embodiment of the present invention.
Figure 2:
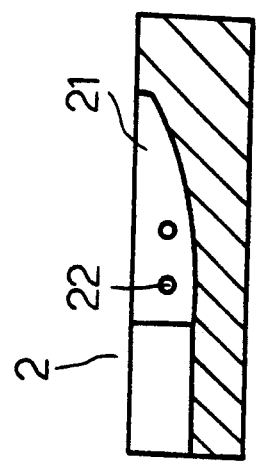
FIG. 2 is a cross sectional view of the bottom block of the height gauge showing the locations of the screw holes thereon.

Referring to FIGS. 1 and 2, a vernier calipers incorporated height gauge in accordance with the present invention is generally comprised of a rectangular bottom block 2, a marking knife 3, a rectangular connecting rod 4, a locating block 5, and a vernier calipers 6. The bottom block 2 comprises an elongate groove 21 on the top, which receives the stationary jaw 61 of the vernier calipers 6, two spaced screw holes 22 on one side perpendicularly extended to the elongate groove 21, a rectangular open chamfer 23 on the top near the elongate groove 21, two opposite screw holes 24;25 on the top near the open chamfer 23 at two opposite ends, a lid 26 fastened to the screw holes 24;25 by screws and covered over the open chamfer 23. The marking knife 3 has a front end terminated to a bevel face 31 and a rear end terminated to an extension indentation 32 having a through hole 33 thereon. The connecting rod 4 has a screw hole 41 on a bottom notch 42 thereof at the center in the longitudinal direction, and a countersink through hole 43 near a top end thereof in the transverse direction. The locating block 5 comprises a side notch 51 having an outside flange 511 at one end at an outer side and a screw hole 52 at an opposite end in the longitudinal direction, and a screw hole 53 on an end notch 54 thereof in the longitudinal direction.

Figure 3:
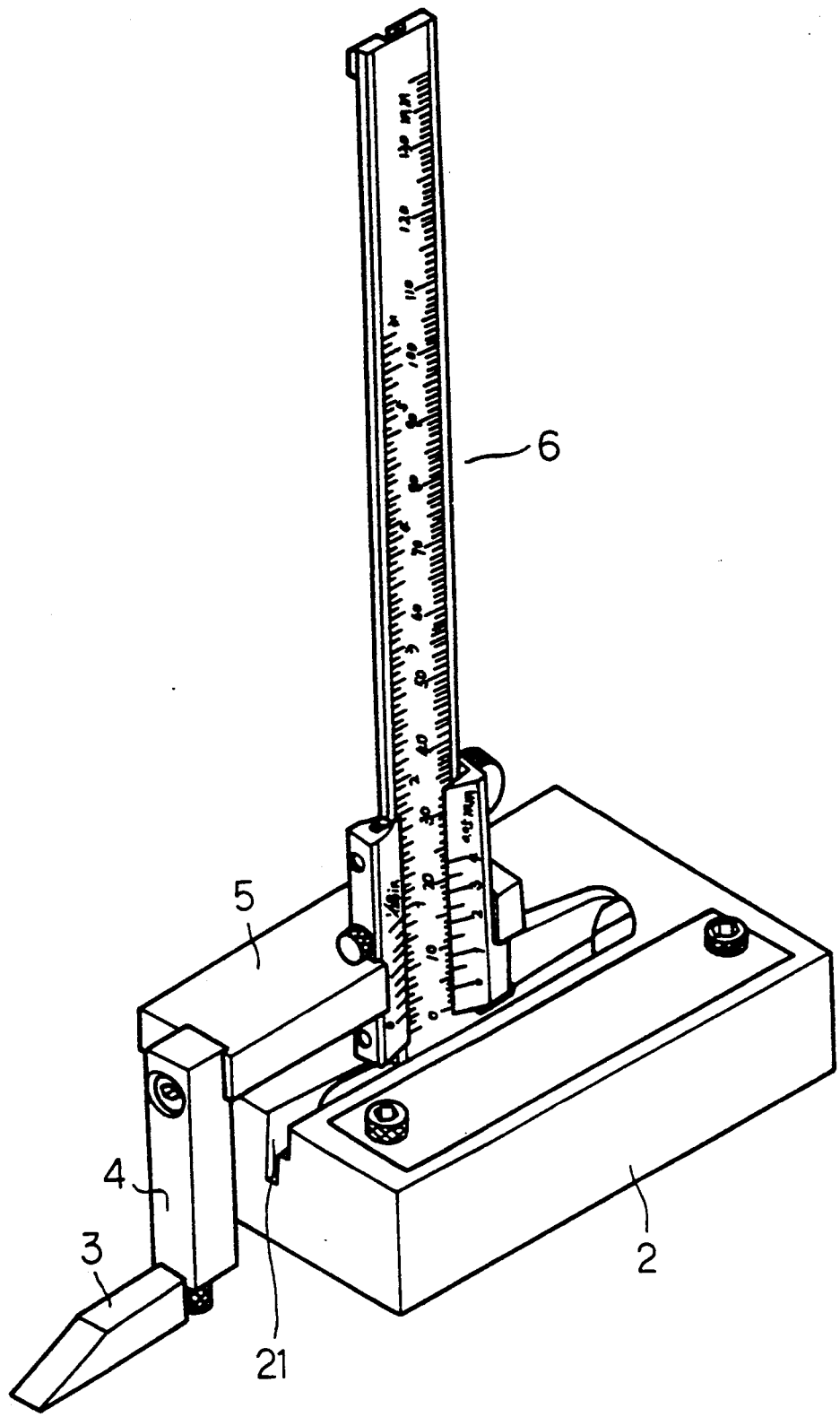
FIG. 3 is a perspective elevational view of the height gauge.

Referring to FIG. 3 and FIGS. 1 and 2 again, the marking knife 3 is connected to the connecting rod 4 at the bottom at right angles by inserting the extension indentation 32 of the marking knife 3 into the bottom notch 42 of the connecting rod 4 and then threading a screw through the through hole 33 on the extension indentation 32 into the screw hole 41 on the bottom notch 42; the connecting rod 4 is connected to the locating block 5 by threading a screw through the countersink through hole 43 on the connecting rod 4 into the screw hole 53 on the end notch 54 of the locating block 5; the locating block 5 is fastened t the vernier of the vernier calipers 6 by inserting the vernier of the vernier calipers 6 into the side notch 51 for permitting it to be retained inside the side notch 51 by the outside flange 511, and then threading a tightening up screw into the screw hole 52 to tighten up the vernier of the vernier calipers 61; the vernier calipers 6 is vertically fastened to the bottom block 2 by inserting the stationary jaw 61 of the vernier calipers 6 into the elongate groove 21 and then threading tightening up screws into the screw holes 22 on the bottom block 2 to tighten up the vernier calipers 6.

Figure 4:
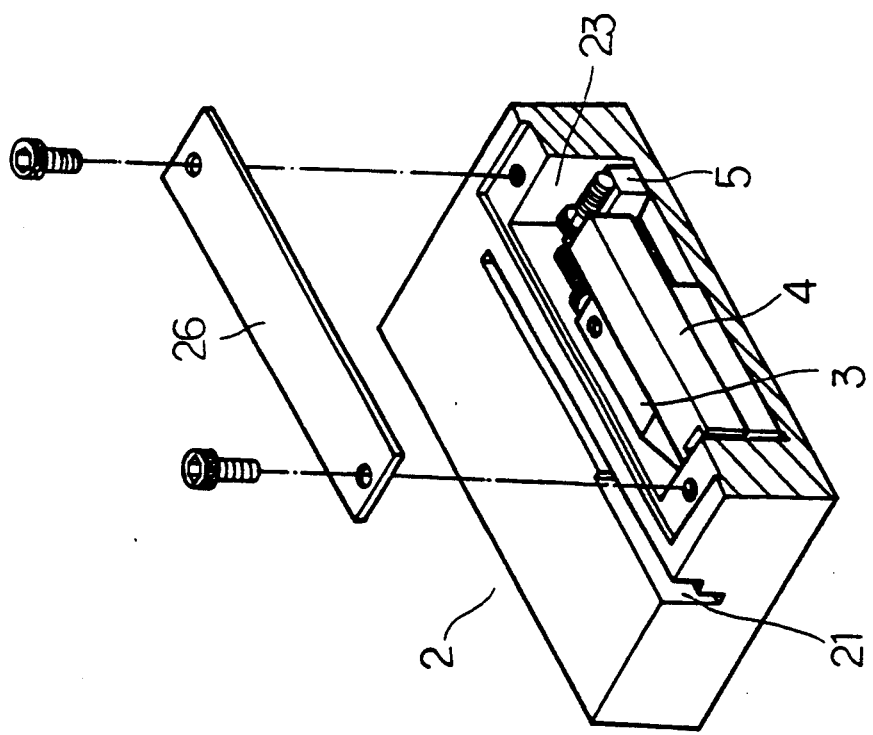
FIG. 4 illustrates the marking knife, the connecting rod, and the locating block received in the open chamfer of the bottom block.

Referring to FIG. 4, when the height gauge is not in use, the marking knife 3, the connecting rod 4, and the locating block 5 are detached from one another and then received in the open chamfer 23, and then the lid 26 is fastened to the bottom block 2 and covered over the open chamfer 23.

As indicated, the present invention provides a vernier calipers incorporated height gauge which is set up by incorporating a vernier calipers with a bottom block, a marking knife, a connecting rod, and a locating block, and which allows the marking knife, the connecting rod, and the locating block to be received inside the bottom block as it is not in use or the vernier calipers is to be used independently.

What is claimed is:

1. A vernier calipers incorporated height gauge made by incorporating a vernier calipers with a marking knife, a connecting rod, a locating block, and a bottom block, wherein: said bottom block comprises an elongate groove on the thereof top, which receives a stationary jaw of the vernier calipers, two spaced screw holes located on one side of said bottom block and perpendicularly extending to said elongate groove, into which two screws are threaded to fasten the stationary jaw of the vernier caliper in said elongate groove; said locating block comprises a side notch on a first side thereof, into which the vernier of the vernier calipers is inserted, an outside flange projecting into said side notch, which retains the vernier of the vernier calipers within said side notch, a first screw hole extending to said slae notch from a second side of said locating block, into which a screw is threaded to fasten the vernier of the vernier calipers to the locating block within the side notch, and an end notch on a third side of said locating block with a screw hole located within said end notch; said connecting rod comprises a bottom notch on one side thereof having a screw hole located in said bottom notch, and a countersink through hole near a top end thereof through which a screw is threaded into the screw hole on said end notch of said locating block to fasten said connecting rod to said locating block; said marking knife comprises a front end terminated to a bevel face for marking, and a rear end terminated to an extension indentation with a through hole located thereon, said extension indentation being inserted into the bottom notch on said connecting rod and fixed thereto by threading a screw through the through hole on said extension indentation into the screw hole on the bottom notch of said connecting rod.

2. The height gauge of claim 1 wherein said bottom block comprises an open chamfer at the top covered with a lid for receiving said marking knife, said connecting rod, and said locating block when disassembled.

* * * * *